(12) United States Patent
Sasaki et al.

(10) Patent No.: US 9,322,457 B2
(45) Date of Patent: Apr. 26, 2016

(54) TURNING DEVICE AND ROTATING MACHINE

(75) Inventors: Yuichi Sasaki, Hiroshima (JP); Kyoichi Ikeno, Hiroshima (JP); Ken Nishitani, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 14/377,024

(22) PCT Filed: Feb. 22, 2012

(86) PCT No.: PCT/JP2012/054237
§ 371 (c)(1),
(2), (4) Date: Aug. 6, 2014

(87) PCT Pub. No.: WO2013/124979
PCT Pub. Date: Aug. 29, 2013

(65) Prior Publication Data
US 2015/0053029 A1 Feb. 26, 2015

(51) Int. Cl.
*F16H 57/00* (2012.01)
*F16H 1/06* (2006.01)
*F01D 25/34* (2006.01)
(Continued)

(52) U.S. Cl.
CPC *F16H 1/06* (2013.01); *F01D 21/00* (2013.01); *F01D 25/34* (2013.01); *F01D 25/36* (2013.01); *F16H 35/18* (2013.01); *Y10T 74/19516* (2015.01)

(58) Field of Classification Search
CPC ... F16H 57/021; F16H 1/006; F16H 2708/10; F01D 25/34; F01D 25/36

USPC ............ 74/405, 406, 142, 380; 384/590, 571, 384/420, 417
See application file for complete search history.

(56) References Cited

U.S. PATENT DOCUMENTS 1,865,842 A * 7/1932 Davidson ...................... 384/588
2,910,894 A * 11/1959 Kenney ................... F01D 25/36
74/8

(Continued)

FOREIGN PATENT DOCUMENTS

CN 1905327 1/2007
EP 2 161 416 3/2010
(Continued)

OTHER PUBLICATIONS

International Search Report issued Mar. 27, 2012 in corresponding International Application No. PCT/JP2012/054237.
(Continued)

*Primary Examiner* — William Kelleher
*Assistant Examiner* — Jake Cook
(74) *Attorney, Agent, or Firm* — Wenderoth, Lind & Ponack, L.L.P.

(57) ABSTRACT

A turning device includes: a pinion gear having spur teeth that mesh with a wheel gear provided on a rotary shaft; an arm member that rotatably supports the pinion gear; an ON/OFF mechanism that operates the arm member such that the pinion is brought close to the wheel gear, in a meshed position, with respect to the wheel gear and such that the pinion is separated radially outward from the wheel gear, in a retracted position; and a supporting device that supports the pinion in an axial direction of the pinion.

4 Claims, 5 Drawing Sheets

(51) Int. Cl.
*F01D 25/36* (2006.01)
*F16H 35/18* (2006.01)
*F01D 21/00* (2006.01)

(56) References Cited

U.S. PATENT DOCUMENTS

| | | | | |
|---|---|---|---|---|
| 2,946,632 | A * | 7/1960 | Kraeling | 384/588 |
| 3,021,719 | A | 2/1962 | Conrad, Jr. | |
| 3,183,726 | A * | 5/1965 | Badger | 74/10.8 |
| 3,919,894 | A * | 11/1975 | Keeter | F01D 25/36 60/788 |
| 4,231,622 | A * | 11/1980 | Paullin | 384/249 |
| 4,538,789 | A * | 9/1985 | An | 251/129.12 |
| 4,643,637 | A * | 2/1987 | Strickler | F01D 25/36 415/123 |
| 5,188,576 | A * | 2/1993 | Maguire | F16H 57/0479 384/424 |
| 6,070,482 | A * | 6/2000 | Kugio et al. | 74/354 |
| 7,681,876 | B2 * | 3/2010 | Silverbrook et al. | 271/10.01 |
| 7,748,288 | B2 * | 7/2010 | Chevalier et al. | 74/409 |
| 2006/0219037 | A1 | 10/2006 | Inose et al. | |
| 2014/0056112 | A1 * | 2/2014 | Villaret | 368/33 |

FOREIGN PATENT DOCUMENTS

| | | |
|---|---|---|
| JP | 49-43676 | 4/1974 |
| JP | 54-42503 | 4/1979 |
| JP | 60-14889 | 4/1985 |
| JP | 5-240327 | 9/1993 |
| JP | 6-56556 | 8/1994 |
| JP | 9-256810 | 9/1997 |
| JP | 11-257020 | 9/1999 |
| JP | 2000-38988 | 2/2000 |
| JP | 2000-320621 | 11/2000 |
| JP | 2002-48196 | 2/2002 |
| JP | 2003-117885 | 4/2003 |
| JP | 2011-220307 | 11/2011 |
| JP | 2012-177331 | 9/2012 |

OTHER PUBLICATIONS

Translation of Written Opinion of the International Searching Authority issued Mar. 27, 2012 in corresponding International Application No. PCT/JP2012/054237.
Extended European Search Report issued Dec. 15, 2015 in corresponding European patent application No. 12 869 325.6.
Office Action issued Feb. 6, 2016 in corresponding Chinese patent application No. 201280068030.5 (with English translation).

* cited by examiner

TURNING DEVICE AND ROTATING MACHINE

BACKGROUND OF THE INVENTION

1. Technical Field

The present invention relates to a turning device that rotates a rotor of a turbine or the like at a low speed, and a rotating machine including the turning device.

2. Description of the Related Art

In the related art, in steam turbines, gas turbines, power generation plants using a combined cycle of the steam turbines and the gas turbines, or the like, it is known that, if a turbine rotor is left at a high-temperature during operation stoppage in a state where the turbine rotor is not rotated, the temperature of steam or gas falls, a temperature difference is caused in a vertical direction within a turbine cylinder, bending caused by thermal elongation occurs in the turbine rotor, or minute bending occurs due to the weight of the turbine rotor at the time of turbine stoppage. Therefore, at the time of operation stoppage and before turbine starting, bending has been prevented that occurs in the turbine rotor by performing the so-called turning that rotates the turbine rotor with a predetermined time and a low speed.

For example, Japanese Unexamined Patent Application, First Publication No. 2000-320621 describes a turning device in which a pinion having spur teeth that is rotatable by the power of a motor is provided so as to be detachably fitted to a wheel gear fixed to a rotor shaft, using the swinging of an arm.

SUMMARY OF THE INVENTION

1. Problems to be Solved by the Invention

However, in the above-described turning device, the alignment between the shafts that support the respective gears, such as the alignment between the pinion shaft and the rotor shaft, may shift during assembly. When the pinion and the wheel gear are fitted to each other and a driving force is transmitted from the pinion to the wheel gear in a state where the alignment has shifted in this way, a thrust force may be applied to the pinion. Then, a problem occurs in that the pinion is displaced in an axial direction by the thrust force, the arm on a stationary side and the pinion on a rotation side come into contact with each other, and wear occurs between the pinion and the arm.

Additionally, when the pinion and the wheel are fitted to each other, a gear curved surface of the pinion and a gear curved surface of the wheel gear may come into contact with each other, and thereby the pinion may not enter a proper meshed position of the wheel gear. In such a case, generally, the process of minutely moving the pinion to fit the pinion to the wheel gear again is performed. However, if the thrust force is applied and the pinion and the arm are brought into a contact state, the pinion may tend to become unrotatable due to friction, and it may be difficult to minutely move the pinion. For example, although a method of increasing an application force during arm swinging and forcibly fitting the pinion to the wheel gear is also considered, since tooth surfaces may be roughened in this case, there is a risk that the tooth surfaces do not slip and the pinion may be not fit to the gear.

The invention has been made in view of the above circumstances, and an object thereof is to provide a turning device capable of smoothly and reliably fitting a pinion and a wheel gear to each other, and a rotating machine including the turning device.

2. Means for Solving the Problems

A first aspect of a turning device according to the present invention includes: a pinion having spur teeth that mesh with a wheel gear provided on a rotary shaft; an arm that rotatably supports the pinion; an ON/OFF mechanism that operates the arm such that the pinion is brought close to the wheel gear, in a meshed position, with respect to the wheel gear and such that the pinion is separated radially outward from the wheel gear, in a retracted position; and a supporting device that supports the pinion in a direction along a central axis of the pinion.

In a second aspect of the turning device according to the present invention, the supporting device in the turning device of the first aspect may be a thrust bearing that supports the pinion in a direction along a central axis so as to be rotatable with respect to the arm.

In a third aspect of the turning device according to the present invention, the turning device of the first aspect may further include a pinion shaft that supports the pinion in a radial direction so as to be rotatable around the central axis, and the supporting device may be a locking device that locks the pinion to the pinion shaft in a direction along the central axis.

A rotating machine according to the present invention includes the turning device of the first aspect to the third aspect.

3. Advantageous Effects of the Invention

According to the turning device and the rotating machine of the present invention, the pinion and the wheel gear can be smoothly and reliably fitted to each other.

DETAILED DESCRIPTION OF THE INVENTION

Figure 1:
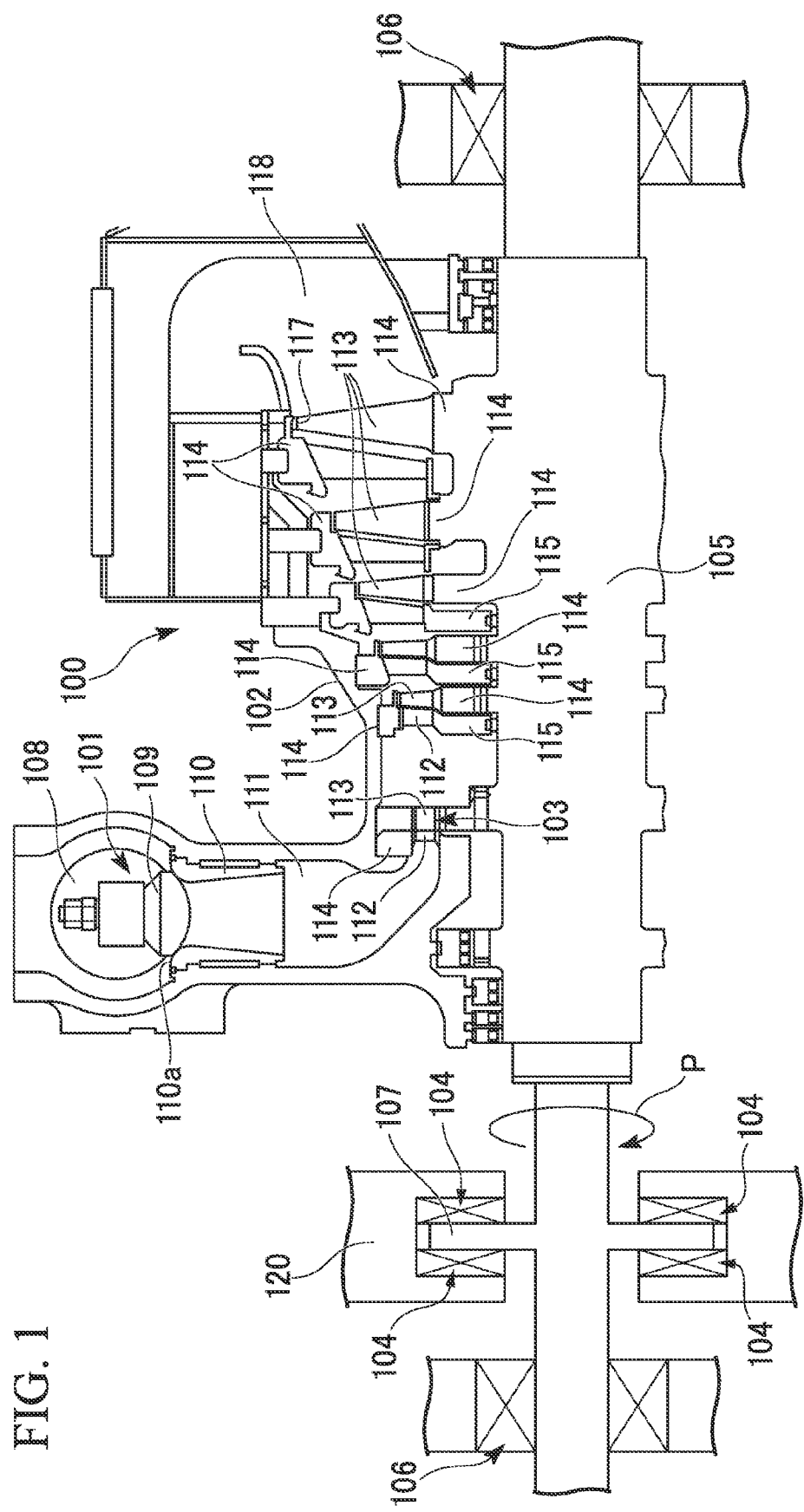
FIG. 1 is an overall configuration view showing a steam turbine in an embodiment of the present invention.

An embodiment of the present invention will be described with reference to FIGS. 1 to 5. FIG. 1 shows a steam turbine 100 as an example of a rotating machine in which a turning device according to the present embodiment is mounted. The steam turbine 100 includes, as main components, an adjusting valve 101 that adjusts the amount and pressure of steam (working fluid) that flows into the steam turbine 100, a casing 102 that maintains pressure, a power generating part 103 that generates power, a rotary shaft 105 that transmits power to machines, such as a compressor, and a journal bearing device 106 and a thrust bearing device 104 that rotatably support the rotary shaft 105 around the shaft. A thrust collar 107 is provided on the rotary shaft 105 substantially in the shape of a flange. Also, the thrust bearing device 104 is arranged to face the thrust collar 107 in an axial direction, thereby supporting the rotary shaft 105 in the axial direction via the thrust collar 107.

A plurality of the adjusting valves 101 are attached to the inside of the casing 102, and each adjusting valve includes an adjusting valve chamber 108 into which steam flows from a boiler (not shown), a valve body 109, and a valve seat 110. The valve seat 110 has a substantially cylindrical shape, and an axial center thereof is orthogonal to the axial center of the rotary shaft 105. The internal diameter of the valve seat 110 gradually increases in a direction toward the rotary shaft 105, and a tip portion of the valve seat communicates with the steam chamber 111. An inner surface of an end portion of the valve seat 110 opposite to the steam chamber 111 forms a curved surface 110a having a curvature that is convex in an inward direction. A lower shape of the valve body 109 forms a portion of a spherical body, and is provided so as to be capable of coming into contact with or separating from the curved surface 110a of the valve seat 110. If the valve body 109 separates from the valve seat 110, a steam flow channel opens, and if the valve body comes into contact with the valve seat 110, a steam flow channel is closed. The adjusting valve 101 controls the flow rate of steam through the opening and closing of the valve body 109. Moreover, the opening/closing timing of the plurality of adjusting valves 101 is adjusted to control the output of a steam turbine.

The steam chamber 111 guides the steam flowing in from the adjusting valve 101 to the power generating part 103 and has a substantial doughnut shape. The steam flow channel of the steam chamber 111 becomes narrow toward the inside and is deflected in the orientation of being parallel to the axial center of the rotary shaft 105.

The power generating part 103 includes a nozzle 112 fixed to the casing 102, and a rotor blade 113 attached to the rotary shaft 105. One set of the nozzle 112 and the rotor blade 113 is referred to as a stage, and six stages are provided in the present embodiment. The nozzle 112 functions to expand steam within a steam passage to produce speed energy, and change the direction of flow to make the momentum of the shaft in a rotational direction.

The rotor blade 113 functions to convert the energy of the steam converted into the speed energy by the nozzle 112 into the rotational energy of the rotary shaft 105.

A number of nozzles 112 are radially arranged and are held by a ring-shaped partition plate outer ring 114 firmly fixed to the casing 102 and a ring-shaped partition plate inner ring 115. A seal structure that prevents steam leakage is provided between an end portion of the partition plate inner ring 115 on the rotary shaft 105 side and the rotary shaft 105. In a stage with high steam pressure, a labyrinth structure is adopted as a seal structure.

A number of rotor blades 113 are radially arranged and are firmly attached to an outer peripheral portion of a disk 116 that protrudes to the rotary shaft 105 and is provided in a cylindrical shape. Shrouds 117 are attached to tips of the rotor blades 113 of a final stage, and fins for preventing steam leakage are attached to positions that face the shrouds 117 on the partition plate outer ring 114.

The rotary shaft 105 rotatably supported by the journal bearing device 106 and the thrust bearing device 104 functions to transmit the power generated by the power generating part 103 to machines, such as a compressor. A seal structure that prevents leakage of steam or the like is provided between the rotary shaft 105 and the casing 102. Exhaust steam, which has operated the steam turbine 100 and is no longer useful, is sent to a condenser (not shown) through an exhaust chamber 118.

The steam turbine 100 includes a turning device 20 that continues the rotation of the rotary shaft 105 at a speed extremely lower than that during turbine operation, at the time of the operation stoppage and starting thereof.

Figure 2:
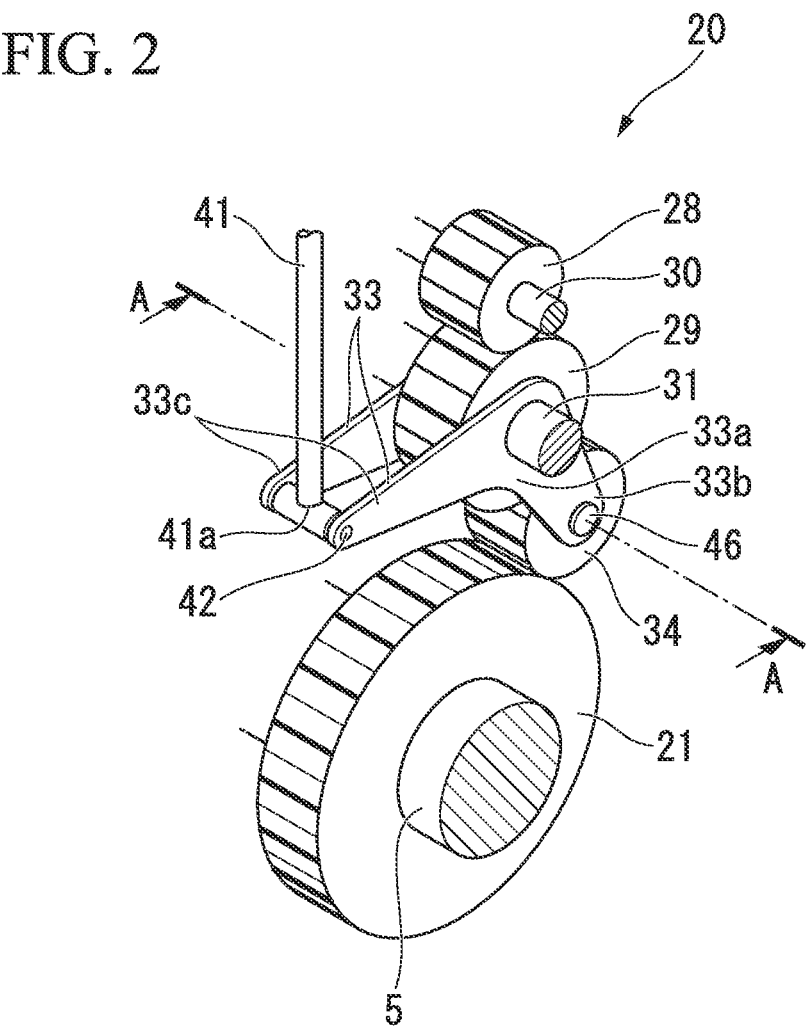
FIG. 2 is a schematic configuration diagram of a turning device in the embodiment of the present invention.
Figure 3:
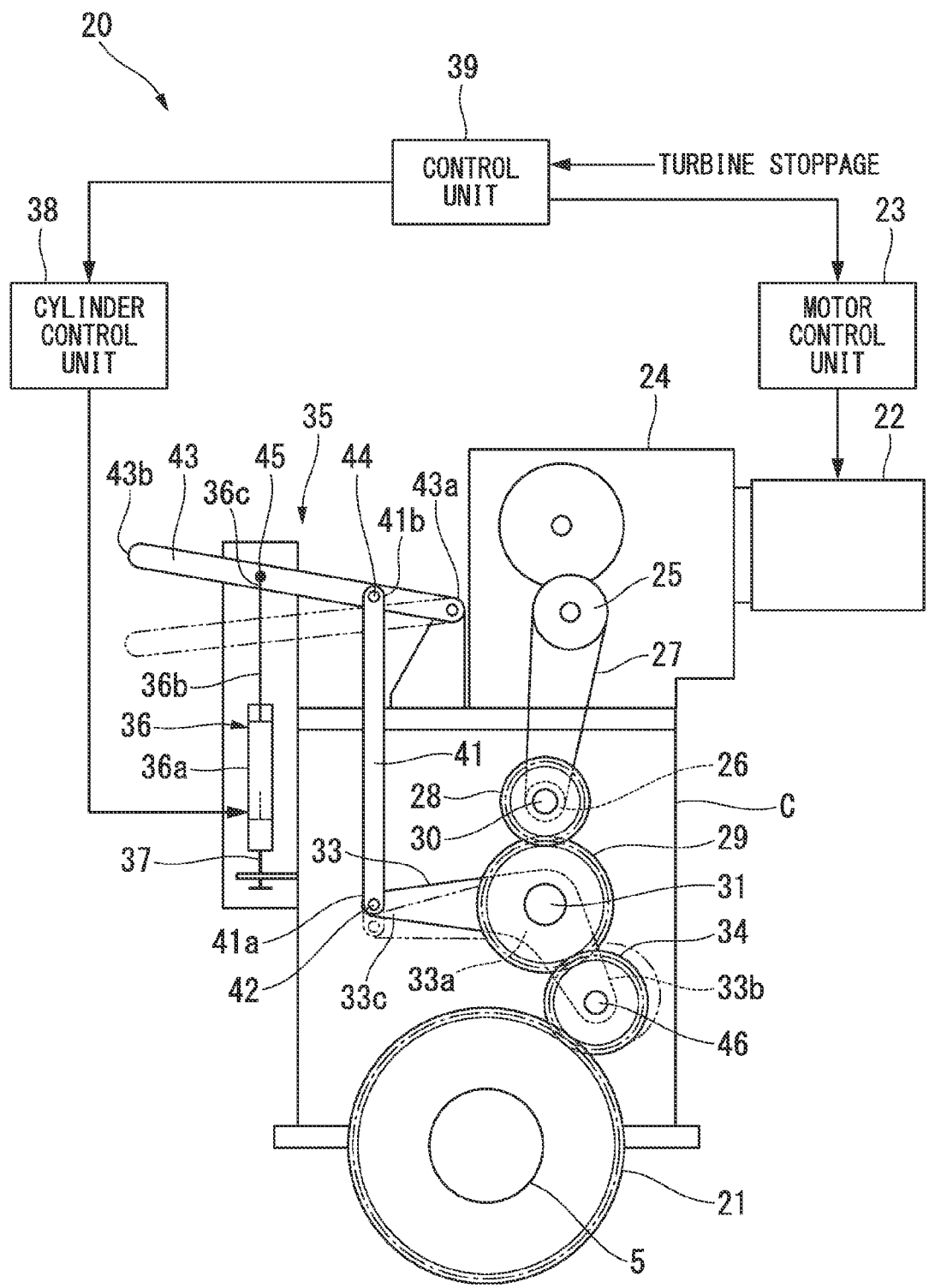
FIG. 3 is a view when a pinion gear in the turning device is viewed from a radial direction.

As shown in FIGS. 2 and 3, a wheel gear 21 is integrally attached to the periphery of the rotary shaft 105. The driving force of the turning device 20 is capable of being transmitted to the wheel gear 21.

The turning device 20 includes a motor 22 for driving. The motor 22 is driven by energization control using a motor control unit 23. Also, a rotor shaft (not shown) of the motor 22 is connected to a speed reduction mechanism 24 that reduces the rotational speed of the rotor shaft. The speed reduction mechanism 24 includes a driving pulley 25, and the rotation of the motor 22 that is speed-reduced is transmitted to the driving pulley 25.

A driven pulley 26 having the same axis direction as the driving pulley 25 is arranged below the speed reduction mechanism 24. Also, a V belt 27 is turned around between the driving pulley 25 and the driven pulley 26.

A first spur gear 28 that rotates around the same axis as the driven pulley 26 is integrally attached to the driven pulley 26. Moreover, a second spur gear 29 having the same axial direction as the first spur gear 28 is arranged below the first spur gear 28. The first spur gears 28 and the second spur gear 29 always mesh with each other. Also, the first spur gear 28 and a rotary shaft 30 of the driven pulley 26, and a rotary shaft 31 of a second spur gear 29 are supported so as to be rotatable with respect to the casing C of the turning device 20, respectively.

A pair of arm members 33 is tiltably supported on the rotary shaft 31 of the second spur gear 29 so as to sandwich the second spur gear 29 from the axial direction. Each arm member 33 is formed so as to be bent at a central portion 33a supported by the second spur gear 29. As the arm member 33 is formed by bending, one end portion 33b thereof extends obliquely downward close to the wheel gear 21. Also, a pinion gear 34 having the same axial direction as the second spur gear 29 and the wheel gear 21 is rotatably journalled to one end portion 33b of the arm member 33. The pinion gear 34 is a spur gear that always meshes with the above-described second spur gear 29. Also, the pinion gear 34 is enabled so as to be displaced between a meshed position (a position shown by a solid line in FIG. 3) where the pinion gear approaches and meshes with the wheel gear 21 due to the tilt of the arm member 33, and a retracted position (a position shown by a two-dot chain line in FIG. 3) separated radially outward from the wheel gear 21.

The turning device 20 further includes an ON/OFF mechanism 35 that tilts the arm member 33 to thereby switch the engaged/disengaged state between the pinion gear 34 and the wheel gear 21.

The ON/OFF mechanism 35 includes an air cylinder 36 as a power source. An inner rod 36b of the air cylinder 36 slidably extends in a vertical direction with respect to an outer case 36a. Also, the outer case 36a of the air cylinder 36 is supported by the casing C via a spring bush 37.

In the air cylinder 36, the sliding position of the inner rod 36b is displaced according to a control command from a cylinder control unit 38. The cylinder control unit 38, for example, controls the opening/closing of a control valve (not shown) to perform the air supply/exhaust of the air cylinder 36, thereby displacing a piston to control the sliding position of the inner rod 36b. In addition, in this embodiment, the above-described motor control unit 23 and cylinder control unit 38 are respectively controlled in an integrated manner by a control unit 39 of the turning device 20.

A lower end portion 41a of an operating rod 41 that extends in a substantially vertical direction is engaged with the other end 33c of the above-described arm member 33 opposite to the above-described end portion. Also, the lower end portion 41*a* is engaged with the arm member 33 via a tilt shaft 42 having the same axial direction as the rotary shaft 31 that is a tilt shaft of the arm member 33. That is, with the displacement of the operating rod 41 in the vertical direction, the other end 33*c* of the arm member 33 is also displaced in the vertical direction, and the arm member 33 is tilted.

Also, an upper end portion 41*b* of the above-described operating rod 41, and an upper end portion 36*c* of the inner rod 36*b* of the air cylinder 36 are engaged with a tilting rod 43 whose one end 43*a* was tiltably supported with respect to the casing C. More specifically, the upper end portion 41*b* of the operating rod 41 and the upper end portion 36*c* of the inner rod 36*b* are respectively tiltably engaged with the tilting rod 43 via tilt shafts 44 and 45 having the same axial direction as the tilt shaft 42. Also, the upper end portion 41*b* of the operating rod 41 and the upper end portion 36*c* of the inner rod 36*b* are each engaged with the tilting rod 43 at positions separated from each other in a longitudinal direction of the tilting rod.

That is, when the inner rod 36*b* of the air cylinder 36 slides in a protruding direction, the inner rod 36*b* pushes up the tilting rod 43, and the other end 43*b* of the tilting rod 43 is displaced upwardly (a position shown by a solid line in FIG. 3). Then, the operating rod 41 engaged with the tilting rod 43 is pulled upward and displaced upwardly together with the tilting rod 43. The other end 33*c* of the arm member 33 is displaced upwardly due to the displacement to upside of the operating rod 41. Then, the arm member 33 is tilted and displaced in a direction in which the pinion gear 34 meshes with the wheel gear 21, that is, the pinion gear 34 comes close to the wheel gear 21 in a radial direction.

Additionally, when the inner rod 36*b* of the air cylinder 36 has slid in a direction in which the inner rod sinks in a state where the pinion gear 34 is meshed with the wheel gear 21, the inner rod 36*b* displaces the other end 43*b* of the tilting rod 43 downwardly. Then, the operating rod 41 is pushed down and displaced downwardly by the tilting rod 43. Then, the other end 33*c* of the arm member 33 displaces downward by the downward displacement of the operating rod 41. Then, the arm member 33 is tilted and displaced in a direction in which the pinion gear 34 is separated from the wheel gear 21, that is, a direction separated radially outward with respect to the wheel gear 21.

Figure 4:
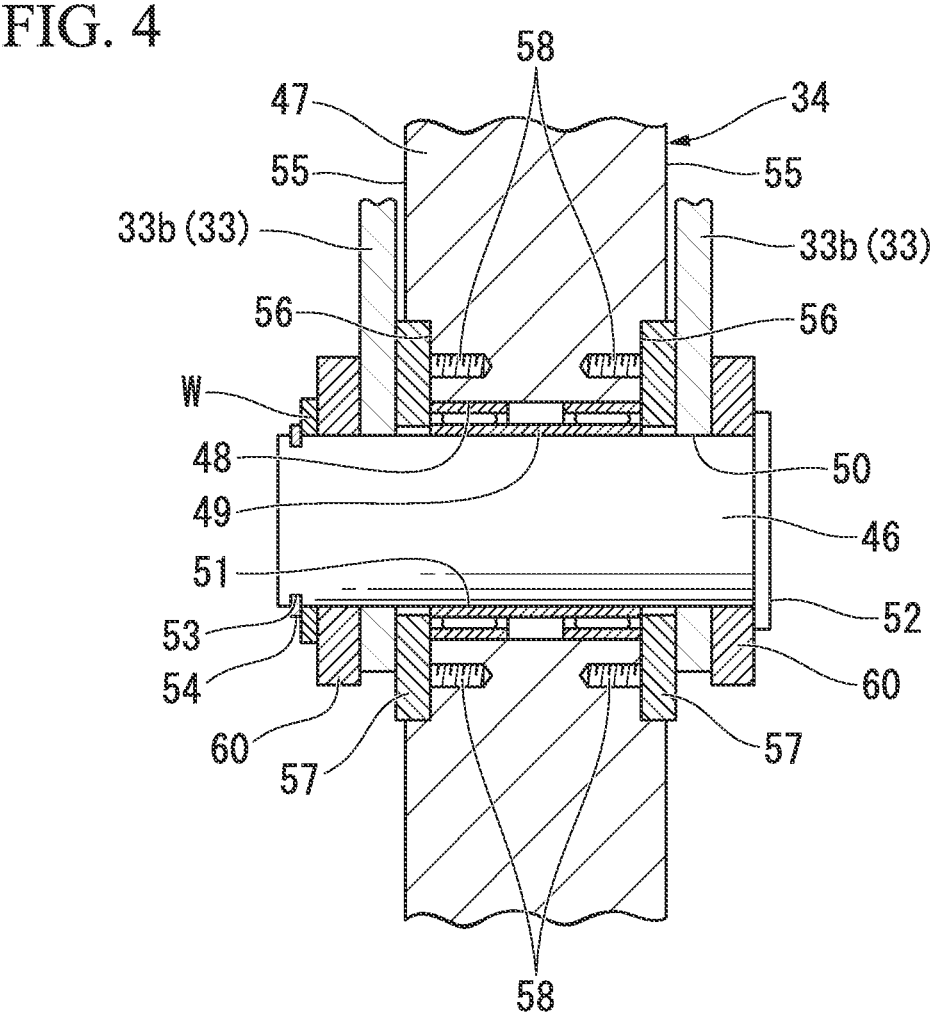
FIG. 4 is a cross-sectional view of the pinion gear.

As shown in FIG. 4, the pinion gear 34 includes a shaft portion 46 as a pinion shaft that supports the pinion gear 34 in the radial direction so as to be rotatable around the axis of the pinion gear, and a substantially disk-like gear portion 47 that has spur teeth formed at an outer periphery thereof. The gear portion 47 has a hole 48 at a radial center position. A cylindrical ball bearing 49 with a slightly shorter axial dimension than the gear portion 47 is inserted into the hole 48. The ball bearing 49 is arranged substantially at the center of the gear portion 47 in the axial direction.

The shaft portion 46 is attached through a hole 50 formed in one end portion 33*b* of the arm member 33, the hole 48 of the gear portion 47, and a hole 51 of the ball bearing 49 in the axial direction. One end of the shaft portion 46 is formed with a larger-diameter portion 52 having a larger diameter than the hole 50 of the arm member 33. On the other hand, an outer periphery of the other end of the shaft portion 46 is formed with a ring-shaped groove 53, and an internal diameter portion of a retaining ring 54 having a larger diameter than the hole 50 of the arm member 33 is fitted into the groove 53. The axial displacement of the shaft portion 46 with respect to the arm member 33 is regulated by the larger-diameter portion 52 and the retaining ring 54. In addition, the arm member 33 or the shaft portion 46 may be formed with a regulating mechanism (not shown), such as a key and a key groove, which regulates the rotation of the shaft portion 46. When the regulating mechanism is provided, the shaft portion 46 can be attached to the arm member 33 in a state where the rotation of the shaft portion 46 relative to the arm member 33 is regulated.

Ring-shaped concave portions 56 are formed at positions closer to a radial outer side than a hole 48 and closer to the axial outer side than the ball bearing 49, on both side surfaces 55 of the gear portion 47 in the axial direction. An annular plate-shaped thrust bearing 57 is inserted into the concave portion 56 and is fixed thereto by a fastening device 58, such as screws. The thrust bearing 57 is a bearing that receives a load applied to the gear portion 47 in a thrust direction. In addition, a method of fixing the thrust bearing 57 to the gear portion 47 is not limited to one using the fastening device 58, and may be appropriately selected from various fixing methods, such as welding and adhesion.

Also, the thrust bearing 57 is attached in a state where an outer portion 59 thereof in a thickness direction protrudes further axially outward than a side surface 55 of the gear portion 47. Accordingly, if the pinion gear 34 tends to be displaced in the axial direction, the thrust bearing 57 abuts the arm member 33 earlier than the pinion gear 34, thereby preventing direct contact of the pinion gear 34 with the arm member 33. Additionally, since only the thrust bearing 57 comes into contact with the arm member 33, the rotation of the pinion gear 34 is not hindered, and a smooth rotatable state is maintained. In addition, reference numeral "60" designates a support bar that guides the pinion gear 34 between the meshed position and the retracted position (not shown in FIGS. 2 and 3). Additionally, a washer W is inserted between the support bar 60 and the retaining ring 54.

Next, the operation of the above-described turning device 20, particularly the operation immediately after the operation stoppage of the steam turbine 100 will be described.

First, the control unit 39 of the turning device 20 causes the inner rod 36*b* of the air cylinder 36 to be held at a sunk position (shown by the two-dot chain line in FIG. 2) by the outer case 36*a* during the operation of the steam turbine 100. In this case, the motor 22 is brought into a stopped state, and the position of the pinion gear 34 is brought into the retracted position.

Thereafter, if a signal indicating that the operation of the steam turbine 100 has been stopped is received from the outside, first, the control unit 39 causes the inner rod 36*b* of the air cylinder 36 to slide to a protruding side via the cylinder control unit 38. Then, the arm member 33 is tilted via the tilting rod 43 and the operating rod 41, respectively. Then, the pinion gear 34 is displaced from the retracted position to the meshed position where the pinion gear meshes with the wheel gear 21 due to the tilt of the arm member 33.

Here, a state where the pinion gear 34 has properly meshed with the wheel gear 21 is detected by a limit switch (not shown) that detects the protruding position of the inner rod 36*b*. In addition, when proper meshing has been made but is not detected by the limit switch, the processing of inching rotation of the motor 22 is performed, and the engagement state between the pinion gear 34 and the wheel gear 21 is detected again by the limit switch. Then, a series of such processing is repeated until the wheel gear 21 properly meshes with the pinion gear 34.

Then, when the proper engagement between the pinion gear 34 and the wheel gear 21 is detected, the driving of the motor 22 is started. Accordingly, the rotative power of the motor 22 is transmitted to the wheel gear 21 via the speed reduction mechanism 24, the driving and driven pulleys 25 and 26, the V belt 27, the first spur gear 28, the second spur gear 29, and the pinion gear 34. Then, the rotary shaft 105 rotates together with the wheel gear 21. In this case, the rotary shaft 105 rotates at a lower speed than that during the operation of the steam turbine 100.

Therefore, according to the turning device 20 of the above-described embodiment, when the alignment between the central axes of the pinion gear 34 and the wheel gear 21 shifts, for example, during assembly, even if the pinion gear 34 and the wheel gear 21 are fitted to each other and a thrust load has been applied to the pinion gear 34, the thrust bearing 57 can receive the thrust load. Therefore, the pinion gear 34 can be prevented from being displaced in the axial direction and being brought into contact with the arm member 33, and the rotation of the pinion gear 34 can be prevented from being hindered. As a result, it is possible to smoothly and reliably fit the pinion gear 34 to the wheel gear 21; particularly it is advantageous to automatically fit the pinion gear 34 to the wheel gear 21.

Moreover, since the pinion gear 34 can be supported by the thrust bearing 57 so as to be rotatable in the axial direction with respect to the arm member 33, when a thrust load has been applied to the pinion gear 34, the displacement of the pinion gear 34 in the axial direction can be prevented. Also, as the thrust load is received by the thrust bearing 57, the pinion gear 34 can be more smoothly rotated. As a result, the pinion gear 34 can be more reliably fitted to the wheel gear 21.

According to the steam turbine 100 of the above-described embodiment, the turning of the rotary shaft 105 can be more rapidly performed by providing the above-described turning device 20.

Also, since the wear of the pinion gear 34 or the arm member 33 can be prevented and the tooth surfaces of the pinion gear 34 and the wheel gear 21 can be prevented from roughening, a malfunction can be prevented from occurring in the turning device 20, and reliability can be improved.

Moreover, when the rotary shaft 105 is reversely rotated, the pinion gear 34 tends to be displaced along the tooth surfaces. However, since the air cylinder 36 is supported via the spring bush 37, the air cylinder 36 can be displaced downwardly, and damage to the turning device 20 can be prevented.

Additionally, since the pinion gear 34 becomes smoothly rotatable as compared to a case where the thrust bearing 57 is not provided, the output of a motor that turns the pinion gear 34 can be reduced.

In addition, the invention is not limited to the above-described embodiment, and design changes can be made without departing from the concept of the invention.

A case where the thrust bearing 57 is provided between the pinion gear 34 and the arm member 33 as supporting means that support the pinion gear 34 in the axial direction has been described in the above-described embodiment. However, the invention is not limited to the configuration.

Figure 5:
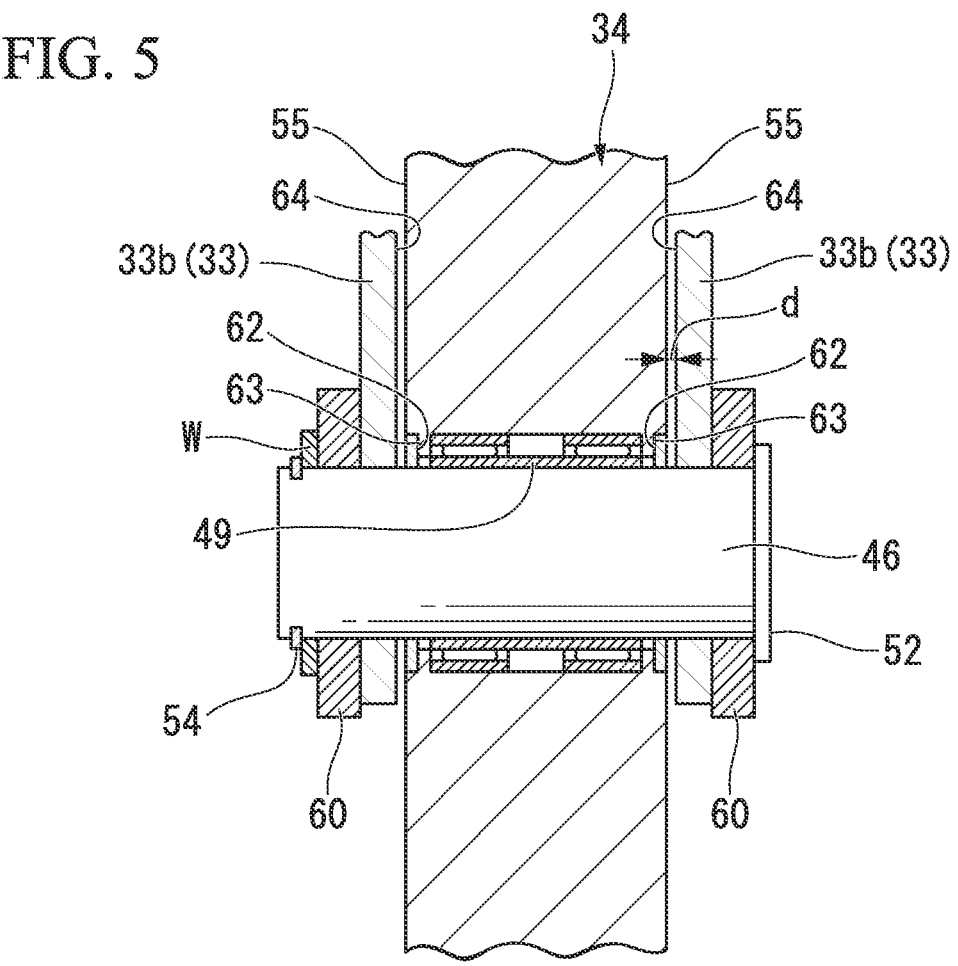
FIG. 5 is a cross-sectional view corresponding to FIG. 4 showing a modified example of the pinion gear.

For example, as shown in FIG. 5, as locking device that locks the pinion gear 34 to the shaft portion 46 in the axial direction, a pair of vertical walls 62 that face an axial outer side may be formed at any one of an outer periphery of the shaft portion 46 and an inner periphery of the pinion gear 34, and a pair of vertical walls that face the vertical walls may be formed at the other side of the outer periphery of the shaft portion 46 and the inner periphery of the pinion gear 34. In this case, a gap d is formed between the side surface 55 of the pinion gear 34 and an inner side surface 64 of the arm member 33.

By adopting such a configuration, the vertical wall 62 formed at the shaft portion 46 and the vertical wall 63 formed at the pinion gear 34 collide against each other in an axial direction when a thrust load has been applied to the pinion gear 34. Therefore, the relative axial displacement of the pinion gear 34 can be regulated by the vertical walls 62 and 63. Therefore, the gap d is maintained between the pinion gear 34 and the arm member 33, and the contact between the pinion gear 34 and the arm member 33 can be prevented.

Additionally, a case where the turning device 20 meshes with the wheel gear 21 provided on the rotary shaft 105, and transmits the driving force of the motor 22 to rotate the wheel gear 21 has been described in the above-described embodiment. However, the invention is not limited to this configuration. For example, a speed reduction mechanism 24 for the wheel gear 21 may be provided and the pinion gear 34 may be fitted to a spur gear provided on the speed reduction mechanism 24 so as to turn the rotary shaft 105.

Additionally, a case where the rotation of the motor 22 is transmitted to the pinion gear 34 via the V belt 27 has been described. However, setting may be made such that slip occurs between the V belt 27 and the driving and driven pulleys 25 and 26 when a torque applied to the V belt 27 reaches a predetermined torque or more. By adopting such a configuration, for example, even if a far larger (about 2 to 3 times) torque than a rated torque is generated during motor starting or the like, the slip occurs between the V belt 27 and the driving and driven pulleys 25 and 26. For this reason, it is possible to prevent each gear from application of an excessive torque. As a result, it is possible to reduce the strength required for each gear, and it is possible to miniaturize each gear in order to miniaturize the device. In addition, belts other than the above-described V belt 27 may be used if a structure capable of causing slip is provided.

In the above-described embodiment, the steam turbine 100 has been used as an example of a rotating machine. However, the invention is not limited to the steam turbine 100, and the turning device 20 may be applied to a gas turbine.

REFERENCE SIGNS LIST

21: WHEEL GEAR
33: ARM MEMBER (ARM)
34: PINION GEAR (PINION)
35: ON/OFF MECHANISM
46: SHAFT PORTION (PINION SHAFT)
57: THRUST BEARING (SUPPORTING DEVICE)
62, 63: VERTICAL WALL (SUPPORTING DEVICE, LOCKING DEVICE)
105: ROTARY SHAFT

The invention claimed is:

1. A turning device comprising:
a pinion having spur teeth configured to mesh with a wheel gear provided on a rotary shaft;
a pinion shaft configured to support the pinion so as to be rotatable around an axis of the pinion;
two arms each including a first end, a second end and a central portion, and configured to support the pinion via the pinion shaft;
a casing which accommodates the pinion, the pinion shaft and the two arms;
a single arm tilt shaft that is provided on the casing and that rotatably supports each of the two arms from the central portion thereof;
an operating rod that extends in a vertical direction, is engaged with the second end of each of two arms via a link mechanism and is capable of moving in the vertical direction;
an ON/OFF mechanism engaged with the operating rod via the link mechanism and configured to operate the two arms by moving the operating rod along the vertical direction, such that the pinion is brought close to the wheel gear, in a meshed position, with respect to the wheel gear and such that the pinion is separated radially outward from the wheel gear, in a retracted position;

concave portions formed on each of side surfaces of the pinion; and thrust bearings configured to be inserted into each of the concave portions.

2. A rotating machine comprising:

the turning device according to claim 1, and a steam turbine provided with the rotary shaft.

3. A turning device comprising:

a pinion having spur teeth configured to mesh with a wheel gear provided on a rotary shaft;

a pinion shaft configured to support the pinion so as to be rotatable around an axis of the pinion;

two arms each including a first end, a second end and a central portion, and configured to support the pinion via the pinion shaft;

a casing which accommodates the pinion, the pinion shaft and the two arms;

a single arm tilt shaft that is provided on the casing and that rotatably supports each of the two arms from the central portion thereof;

an operating rod that extends in a vertical direction, is engaged with the second end of each of the two arms via a link mechanism and is capable of moving in the vertical direction;

an ON/OFF mechanism engaged with the operating rod via the link mechanism and configured to operate the two arms by moving the operating rod along the vertical direction such that the pinion is brought close to the wheel gear, in a meshed position, with respect to the wheel gear and such that the pinion is separated radially outward from the wheel gear, in a retracted position;

concave portions formed on each of side surfaces of the pinion; and locking devices configured to be inserted into each of the concave portions.

4. A rotating machine comprising:

the turning device according to claim 3, and a steam turbine provided with the rotary shaft.

* * * * *